United States Patent Office 2,909,832
Patented Oct. 27, 1959

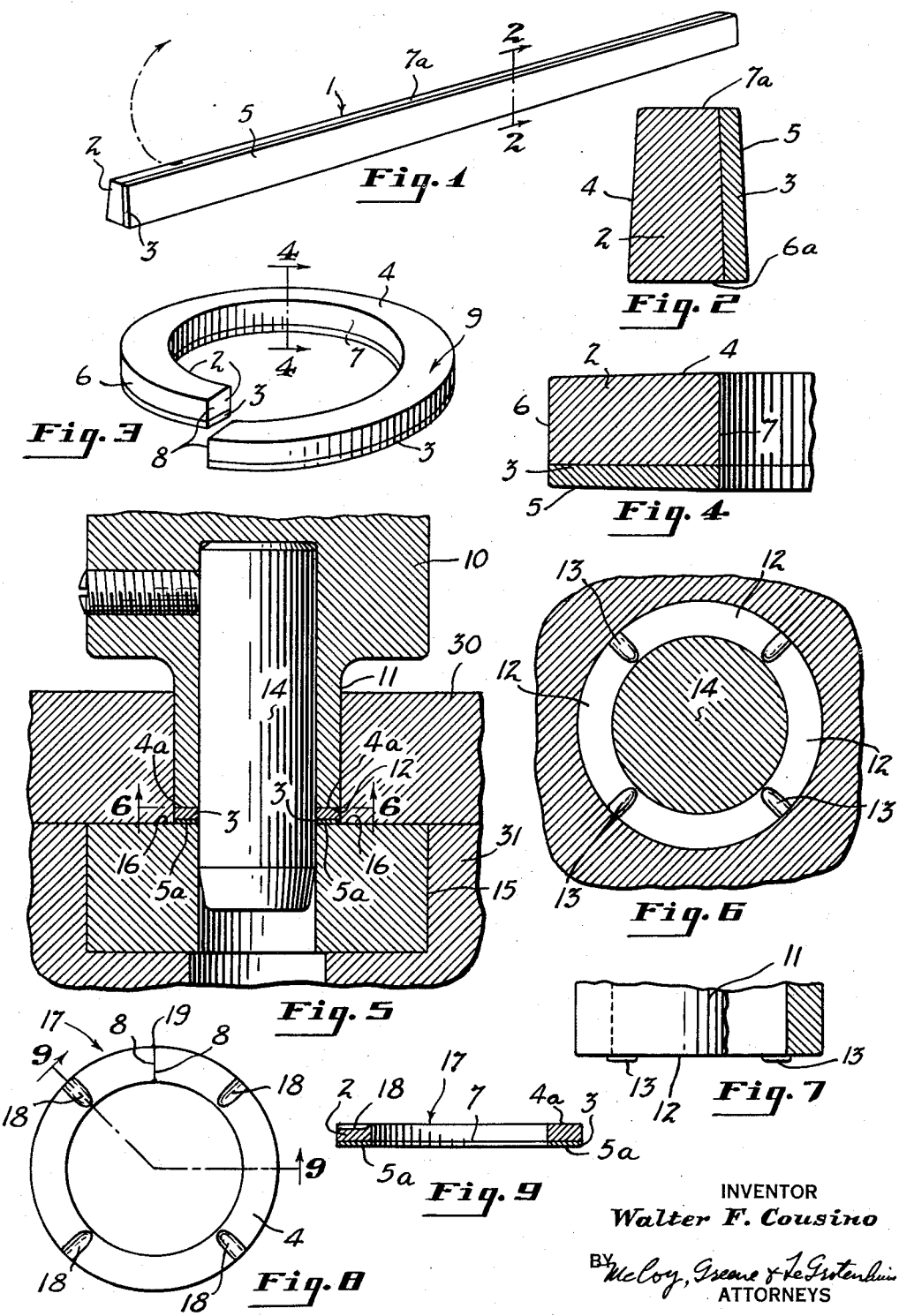

2,909,832
METHOD OF MAKING A LAMINATED BEARING

Walter F. Cousino, Toledo, Ohio

Application May 31, 1955, Serial No. 512,047

6 Claims. (Cl. 29—149.5)

This invention relates to a method of making a laminated thrust washer or bearing. It particularly relates to a method of making a laminated bearing, which has a densified layer of relatively soft bearing metal and a steel backing, from a laminated strip of material with minimum waste.

In the fabrication of thrust bearings from sheets of laminated material, such as a layer or tier of aluminum bonded to a steel backing, bronze or brass bonded to steel, etc., by punching annuli out of the sheet much waste of expensive material is incurred. This waste occurs in the loss of the ring centers and also in the triangular-shaped pieces left between the ODs of the punched rings.

While it has always been desirable to form laminated thrust bearings from strips of bonded, laminated material so as to eliminate this waste it has, in the past, been impractical to do so. Prior attempts to form such bushings from strips has always resulted in an imperfect bushing, characterized primarily by a large gap between the ends of said strip when it is formed into a circle or ring. This gap is undesirable for functional purposes of a thrust bearing, tending to cause excessive wear on the shoulder and bearing to which such bushings are applied.

It is an object of the present invention to create a thrust bearing made from a strip of laminated material and having no gap or space between the ends of said strip when formed into a circle.

It is another object of the present invention to provide a method for making laminated thrust bearings from strips of laminated material.

A further object of the present invention is to eliminate the waste now concurrent with the stamping of laminated thrust bearings and thereby provide a cheaper and more economical method of producing laminated thrust bushings.

A still further object of the present invention is to provide a method for fabricating laminated thrust bearings from strips of laminated metal having one relatively soft metal layer and a layer of relatively hard metal.

Other objects of the invention will be apparent from a description of the invention as illustrated by the accompanying drawings and illustrations in which:

Figure 1 is a perspective view of a strip of laminated metal rolled into generally keystone shape preparatory to forming into circular form and illustrating the direction of curl of said strip;

Fig. 2 is a cross-sectional view of the laminated strip shown in Fig. 1 and taken on the line 2—2 of Fig. 1;

Fig. 3 is a perspective view of the laminated strip illustrated in Fig. 1 after said strip has been formed into a helix or lock-washer shape;

Fig. 4 is a cross-sectional view of the circular strip taken on the line 4—4 of Fig. 3;

Fig. 5 is a cut-away view of a typical apparatus for flattening the circular strip and closing the gap in said circular strip;

Fig. 6 is a surface view of the apparatus of Fig. 5 taken on the line 6—6 of Fig. 5;

Fig. 7 is an elevational view of the punch with parts removed, to illustrate the nubbins projecting from the surface of said punch;

Fig. 8 is a bottom plan view of the finished bushing illustrating the closed gap and clearly showing the indentation marks resulting from the flattening and closing operation; and Fig. 9 is a sectional view on the line 9—9 of Fig. 8 of a bearing embodying the present invention.

I have found that laminated strips of metal, sheared from laminated metal sheets, can be successfully and economically fabricated into thrust bearings by rolling said strips so as to form a section of generally keystone shape, having an upper and lower relatively flat surface which are generally parallel, and side edge portions which are relatively flat, with one side being somewhat less in area than the opposite side edge so as to form the keystone shape illustrated in Fig. 1. This keystone shape strip is then formed into a helix having about one complete turn. The helix may be formed with apparatus as described in the Garrett Patent 1,989,750 by winding the keystone shaped bar about a suitable mandrel disposed adjacent the thinner edge of said strip and severing segments of the desired size from the remaining strip. The forming of the strip into helical shape, as above described, causes thickening of the I.D. portion of the strip so that the resulting helix has generally substantially parallel flat surfaces and side edges of substantially equal dimension.

In accord with the next step of my invention, the helix shaped laminated bar is compressed by pressing against a large area or preferably the entire surface of the softer layer of metal and simultaneously applying the opposing force to relatively smaller limited areas of the surface of the harder metal layer to cause localized flow of the latter preferably to a greater longitudinal extent in the regions of greater radius whereby the outer peripheral portions of the harder metal are extended more than the inner peripheral portions. This is most readily accomplished by deforming and compressing means such as punch and die apparatus in which one of the members, such as the punch, has one or more small projections (or nubbins) and the other member, such as the die block, has a far larger or continuous smooth working surface. The dimension of the cavity of the die block and of the punch are such that radial expansion is minimized. The helix is inserted in the apparatus in such manner as to insure that the flat surface of the softer layer of metal is in contact with the die block when compressed; the punch with its raised projections or nubbins are in contact with the flat surface of the layer of harder metal. However, it is to be understood that the raised projections or nubbins could be located in the die block and the smooth surface be on the punch, without in any way departing from my invention. The laminated helix compressed in such a manner is elongated slightly more in outer peripheral regions or in regions having a radius greater than that of the neutral axis, with the result that a substantially perfect circle with the butt ends of the strip tightly abutting each other and with the flat surfaces being substantially parallel is formed. A substantially perfect laminated thrust bearing is thus formed without waste of expensive material. By applying pressure to limited areas only of the harder metal, both the harder metal and the softer metal are thereby extended so as to close the gap in the helix and form a substantially perfect circle. The application of the coining pressure causing some flow throughout the main body of the unit likewise removes the helix shape and a flat bushing in one plane results.

Referring more specifically to the drawing, in which like numbers refer to like parts in each of the figures:

A rolled strip 1 having a layer 2 of relatively hard, tough metal, such as steel, and a layer 3 of softer metal, such as aluminum, copper, bronze, etc. (preferably aluminum), and having a relatively flat surface of steel 4 and a substantially flat surface of aluminum or other soft metal 5, and having a wide side edge 6a and a narrower side edge 7a and butt ends 8, is bent about an axis disposed closer to side edge 7a than to side edge 6a and served at suitable lengths to form a substantially complete turn of a helix 9, which may be similar in appearance to a lock washer. Formation of the helix 9 tends to compress the side edge portion 7a and thicken it to equalize the surface areas of the unequal side edges 6a and 7a, resulting in side edges 6 and 7 of approximately equal area in the helical turn (Fig. 3). Said helix 9 is inserted in a suitable coining or compressing apparatus 10 comprising a punch 11 having a generally smooth working surface 12 and interspersed thereon suitable raised projections or nubbins 13 at suitably spaced intervals. Said punch 11 has means for inserting and holding a guide and sizing pin 14 which provides means for sizing the inner periphery of the bearing. A suitable die block 15 having the desired surface configuration for the bearing portion, generally a flat, smooth working surface 16, provides the surface which bears the pressure exerted by the surface 5a through the bearing metal. Suitable means (not shown) for applying pressure to the ram or punch 10 and for supporting the die block 15 to resist this great pressure is provided. The die block holder 31 and the plate 30 having the washer receiving bore are moveable or slidable relative to each other when the pin 14 and the punch 10 is retracted out of the bore of the plate 30 so that the bearing 17 may be removed.

The helix 9 is fed into the compressing apparatus 10 in such manner that the flat surface 5 of the soft metal 3 is in contact with the surface 16 of the die block 15, which is usually preferably smooth but which may be provided with suitable ridges (not shown) for forming oil grooves if such are desired. The flat surface 4 of the steel layer 2 is thus in position for contact with the combined smooth surface 12 and nubbins 13 of the punch 11. When pressure is applied to the punch 11, said punch 11 with its guide pin 14 moves downwardly and the working surfaces 12 and 13 of said punch 11 makes contact with the flat surface 4 of the steel layer 2. When suitable pressure is thus applied, the nubbins 13 penetrate the flat surface 4 of the steel layer 2 to the full depth of the nubbins 13, so that the smooth surface 12 of the punch 11 is in contact with the remaining area of the flat surface 4. This causes the steel layer 2 to extend and since extension of metal is more readily accomplished than compression, the major metal flow is radially outward and circumferential of the bearing, so that the ends 8 are caused to come into close contact. The outward extension of the steel caused by the nubbins 18 causes the ends 8 to remain compressed together. The helix thus becomes and remains a circle in one plane, resulting in a thrust bearing 17 with indentations 18 made by the penetrations of the nubbins 13 in the flat surface 4 and having the butt ends 8 of said strip 1 in contact. Only a hairline 19 remains visible to indicate any separation.

In forming the sheet metal laminae from which the basic strip is cut, aluminum, copper, copper base alloy such for example as bronze, or even a sintered compressed metal powder such as a mixture of metal powders including copper, bronze, etc. in other bearing metal, or other relatively soft metal, is bonded to the relatively hard metal by processes well-known in the art. The bonding ingredient in the case of aluminum is usually a very thin layer of silver or silver alloy; in the case of bronze or copper base material, it is usually a flash copper electroplate or plating of copper deposited from solution.

The article produced in accordance with the method of the present invention, wherein the metal is confined in a circular cavity and caused to flow so as to fill this cavity, has crystal structure characteristics showing cold flow of the harder metal both from the region of the pockets or grooves and from the circular bending of the strip, so that one can tell that the washers were once pieces of strip material. The outer circumferential portion of the washers are, because of the cold flow of the metal therein, generally under compressive strain as indicated by the fact that the ends of the strip when formed in an annulus are exceedingly tightly compressed and remain in this state, whereas when the substantial flow of the steel or harder metal from limited areas is not provided, as in the case when the said nubbins are removed, the ends of the strip spread apart when removed from confinement of the cavity, even though the cavity was also completely filled.

Furthermore, it is to be understood that in accordance with the provisions of the patent statutes, the particular form of product shown and described and the particular procedure set forth are presented for purposes of explanation and illustration and that various modifications of said product and procedure can be made without departing from my invention.

What I claim is:

1. A method for making laminated bearings from laminated metal strips composed of a relatively dense metal layer bonded to a relatively soft metal layer which comprises forming from said strip a piece having the form of one turn of a helix with said layers on the top and bottom faces thereof, confining and compressing said piece to flatten the same by maintaining a substantially equal pressure on a relatively large area of the flat surface of the softer metal while simultaneously applying equal, initial opposing pressure on a limited surface of the harder metal so as to deform the harder metal to cause it to flow and form a substantially complete circle, and then maintaining said pressure equally on the flat surfaces of both the hard and soft metals.

2. A method for manufacturing laminated bearings from bonded laminated strip stock having one layer of relatively hard metal and a layer of relatively soft metal bonded thereto, said method comprising rolling said strip so as to form a generally keystone shape, bending said keystoned shaped strip about an axis substantially perpendicular to the laminations and spaced from the strip at the side thereof having the edge of least thickness to form a piece having the form of one turn of a helix, compressing said helix-shaped piece to flatten the same and maintaining a uniform, even pressure over a major portion of the surface of the softer metal while simultaneously applying an equal initial pressure on a relatively limited surface area of the harder metal so as to extend the harder metal and form transverse grooves therein so that the butt ends of the helix meet and remain together.

3. A method for fabricating laminated bearings which comprises rolling a laminated strip having a layer of relatively soft metal bonded to a layer of relatively hard metal to make one side edge of the strip thinner than the other, bending said strips about an axis that is substantially perpendicular to the laminations and spaced from and generally parallel to the thinner of said side edges to form one turn of a helix having upper and lower surfaces formed, one of the hard metal and the other of the soft metal, confining and deforming said helix in a circular cavity having dimensions corresponding to those desired for said bearings, compressing said helix to flatten the same and applying a uniform deforming pressure on the major portion of the surface of the softer metal of said helix strip, and simultaneously applying an equal, initial pressure to relatively small areas of the surface of the harder metal, so as to form transversely extending grooves thereon to cause the butt ends of said strip to abut and remain in such position and to force the metal of said strip against all walls of said cavity.

4. A method of fabricating a flat annular thrust washer bearing comprising shearing a strip from a laminated sheet of metal, said sheet comprising a layer of one metal or alloy bonded to a layer of a softer metal or alloy, rolling said strip to form a generally kepstone shape, bending said keystoned shaped strip about an axis, which axis is substantially perpendicular to said layers and spaced from and generally parallel to a narrower flat surface of the keystoned shaped strip, severing said strip to provide a piece in the form of a single, substantially complete turn, deforming said turn by applying in a circular cavity uniform pressure on the entire surface of the softer metal or alloy and simultaneously applying an equal, initial deforming pressure at limited areas of the harder metal so as to form transverse grooves therein and to cause said turn to lie flat and butt ends to remain substantially in contact with each other, and to cause it to flow against the walls of said cavity.

5. A method of making laminated thrust bearings which form a complete circle comprising forming a generally helix shaped ring from a single strip having top and bottom laminations composed of metals of different hardness, disposing said ring in a circular cavity of a suitable mold, which cavity has only a slightly larger inner and outer diameter than said ring, compressing said ring by applying uniform pressure on the entire surface of the softer metal of the laminated ring, and simultaneously applying equal pressure on a limited area of the harder metal of the laminated ring so as to form transverse grooves in the harder metal and to cause said metals to flow against the inner and outer walls of said cavity and to press and hold the butt ends of said laminated ring together.

6. A method of forming flat laminated thrust bearings comprising confining a roughly formed open ring composed of a bent laminated strip having top and bottom laminations of different hardness in a circular mold cavity, applying deforming pressure to a relatively large surface area of the softer metal lamination and simultaneously applying an equal and opposite pressure to only relatively limited areas of the harder metal to cause said harder metal to flow outwardly and circumferentially, whereby the open ends of said ring are caused to abut and remain in contact.

References Cited in the file of this patent

UNITED STATES PATENTS

| | | |
|---|---|---|
| 1,906,273 | Klocke | May 2, 1933 |
| 1,910,221 | Klocke | May 23, 1933 |
| 1,913,204 | Larzelere | June 6, 1933 |
| 2,177,584 | Salanksky | Oct. 24, 1939 |
| 2,269,839 | Young | Jan. 13, 1942 |
| 2,365,973 | Rachlin | Dec. 26, 1944 |
| 2,555,497 | McCullough et al. | June 5, 1951 |
| 2,618,050 | Thomas | Nov. 18, 1952 |
| 2,683,922 | Zion | July 20, 1954 |